Sept. 4, 1962  M. J. NEVILL  3,052,265
APPARATUS FOR CLOSING PIPELINES
Filed June 6, 1960
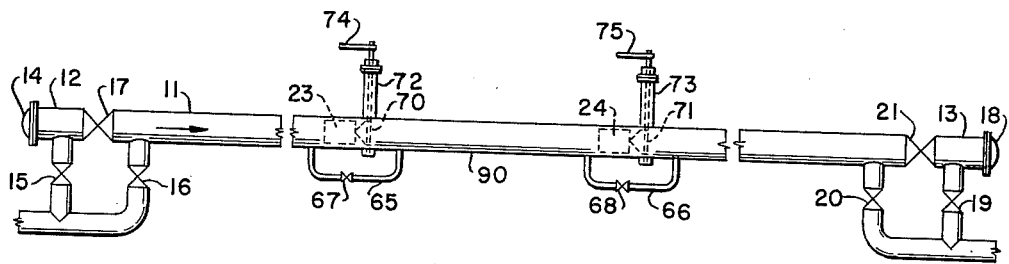
FIG. 1
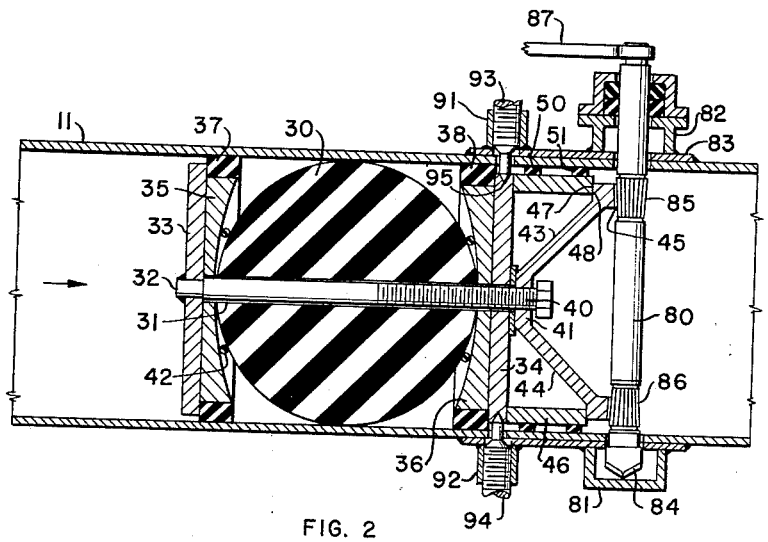
FIG. 2
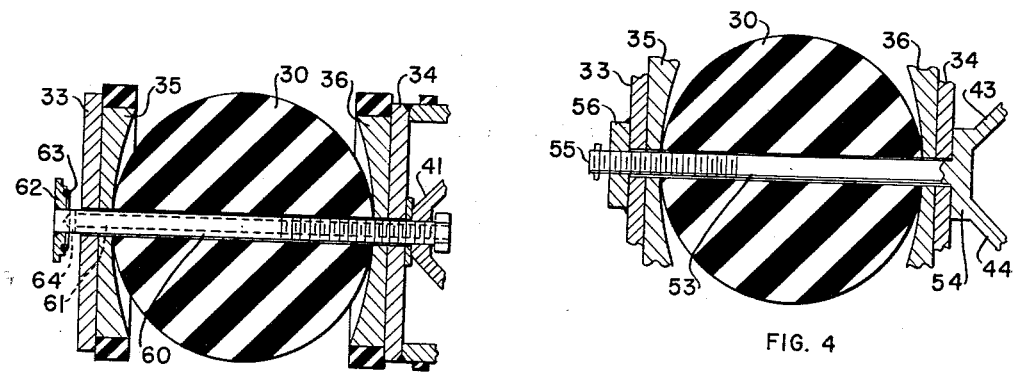
FIG. 3
FIG. 4
INVENTOR:
M. J. NEVILL
BY: J. H. McCarthy
HIS AGENT

United States Patent Office 3,052,265
Patented Sept. 4, 1962

3,052,265
APPARATUS FOR CLOSING PIPELINES
Mason J. Nevill, Houston, Tex., assignor to Shell Oil Company, New York, N.Y., a corporation of Delaware
Filed June 6, 1960, Ser. No. 34,217
4 Claims. (Cl. 138—97)

This invention relates to pipelines, and pertains more particularly to an apparatus for closing a section of pipeline in order to carry out various mechanical operations on a section of pipeline under pressure without the necessity of draining the entire line.

From time to time it is necessary to work on sections of cross-country pipelines for various purposes, such for example, as repairing a leak, inserting a valve or a flow-indicating device, installing a branch line, etc. Generally, it is necessary at present to drain the pipeline or a substantial length thereof when it is desired to repair the line or do any maintenance on it. Since a portion of line to be drained may contain many thousands of barrels of fluid, it is both time-consuming and expensive to drain the fluid from the line and transport it to available storage facilities.

It is therefore an object of the present invention to provide an apparatus for closing off a section of pipeline under pressure in order to carry out various mechanical operations on the closed section of pipeline.

A further object of the present invention is to provide an apparatus adapted to be set in a pipeline for positively sealing the pipeline in a fluidtight manner.

Still another object of the present invention is to provide an apparatus for closing a portion of the pipeline between two points so that the portion of pipeline may be removed from the pipeline system.

These and other objects of this invention will be understood from the following description taken with reference to the drawing, wherein:

FIGURE 1 is a schematic representation of a portion of a pipeline system showing the apparatus of the present invention mounted thereon;

FIGURE 2 is a cross-sectional view of one form of a pipe plug illustrated as being positioned in a pipeline; and, FIGURES 3 and 4 are cross-sectional views of other forms of pipeline plugs which may be employed in accordance with the present invention.

Referring to FIGURE 1 of the drawing, a pipeline 11 is shown as being provided with a pair of scraper traps 12 and 13. The upstream trap 12 is provided with a removable cover 14 and valves 15, 16 and 17, while the downstream scraper trap 13 is provided with removable cover 18 and valves 19, 20 and 21. During normal operations of the pipeline, valve 16 at the upstream trap 12 is open or all three valves 15, 16 and 17 may be open. At the downstream trap 13, at least valve 20 is open at all times during normal operations of the pipeline, and, if desired, all three valves 19, 20 and 21 may be open.

When a pipeline plug or scraper 23 or 24 is to be installed in the pipeline, valves 15 and 17 at the upstream trap 12 are closed when the cover 14 is removed. The plug 23 would then be inserted into the pipeline 11 and the cover 14 replaced and secured to the pipe in a fluid-tight manner. Valves 15 and 17 would then be open and valve 16 would be closed so that the flow stream in the pipe would get in back of the plug 23 and propel it along the pipeline 11. When the plug 23 was to be removed from the pipeline, valve 21 at the downstream trap 13 would be open along with valve 19 so that the plug 23 would be forced up against the cover 18. After opening valve 20 and closing valves 19 and 21, the cover 18 could be removed from the scraper trap 13 and the plug 23 extracted from the pipeline. The pipe plug illustrated in FIGURE 2 comprises a resilient sphere made of any suitable resilient material, preferably rubber, which is provided with a hole 31 therethrough so that the sphere 30 may be mounted on the shaft 32 rigidly secured to an end plate member 33 and slidably extending through a second end plate 34 on the opposite side. The end plates 33 and 34 are preferably round in shape and are of a diameter slightly less than that of the pipeline 11 in which they are to be situated. If desired, a second plate 35 and 36 may be positioned adjacent and/or fixedly secured to the respective end plates 33 and 34. The facing surface of the plates 35 and 36 are concave and in contact with the periphery of the rubber sphere 30 at the point where the shaft 32 passes through the sphere 30. Rubber rings 37 and 38 are secured to the outer surface or edges of the end plates 35 and 36 to form rubber bumpers preventing the metallic end plates 33 and 34 from wearing on the inner surface of the pipeline 11.

The resilient sphere 30 may be of a diameter equal to or slightly greater or slightly less than that of the pipeline 11. In some cases it is desirable to have the rubber sphere 30 of a diameter slightly less than that of the pipe 11 so that fluid can bypass the plug, especially at the time when it is stopped within the pipeline. However, in the event that the rubber sphere 30 is to be employed as a frictional member preventing rotation of the plug when the sphere is to be sealed against the walls of the pipeline 11, it is preferred that the rubber sphere be equal to or slightly greater than the internal diameter of the pipeline 11.

One end of the shaft 32 is threaded, as at 40, and has a take-up nut 41 mounted thereon and bearing against end plate 34. Thus, upon turning the nut 41 in a clockwise manner it is threaded further on to the shaft 32 and the end plates 33 and 34 are drawn together causing the resilient sphere or rubber packer 30 to expand radially against the inner walls of the pipeline 11. If desired, an additional O-ring seal 42 may be provided for forming a more positive fluidtight seal around the shaft 32. Fixedly secured to the nut 41, as by welding, are two or more arms 43 and 44 which extend downstream of the nut a distance sufficient to allow the nut 41 to be advanced on to the threaded portion 40 of the rod 32 a maximum distance. Fixedly secured to the arms 43 and 44 at the outer ends thereof is a ring gear 45 which is mounted normal to the axis of the shaft 32. If desired, secondary bearing means may be provided by fixedly securing, as by welding a short section of pipe or a cylindrical element 46 to the face of the end plate 34. Thus, the outwardly-extending end face 47 of the cylindrical element 46 forms a bearing surface on which a shoulder 48 formed at the outer end of arms 43 and 44 may rotate. Instead of employing arms 43 and 44, the support member between the nut 41 and the ring gear 45 may be in the form of a hollow cone-shaped element.

Changes may be made in the construction of the pipeline plug without altering its general method of operation. Thus, as shown in FIGURE 4, the axial rod 53 through the resilient sphere 30 of a pipeline plug may be fixedly secured at one end to a stop or bearing element 54 on which arms 43 and 44 and ring gear 45 are mounted. The opposite end of the rod 53 is threaded as at 55 and is provided with a take-up nut 56. Thus, instead of merely turning the take-up nut 41 on shaft 32 to compress the rubber sphere 30 as shown in FIGURE 2, in the construction shown in FIGURE 4 the entire rod 53 and beveled gear 45 are turned with take-up nut 56 remaining stationary.

In another modification of the pipeline plug of the present invention, auxiliary fluid flow passage means are provided through the plug when it is in its normal inoperative position.

The shaft 60 of the pipeline plug shown in FIGURE 3 is tubular or is provided with a bore 61 therethrough. The ends of the bore 61 communicate with the space outside the shaft 60 with one end of the shaft 60 being provided with a suitable valve for closing the bore 61 against fluid flow therethrough when the rubber sphere 30 is in its expanded position forming a barrier within a pipeline. One form of valve is shown as comprising a plate 62 secured to the end of the shaft 60 and being provided with an O-ring seal 63 on the innerface thereof for sealing against the end plate 33. When the pipeline plug is to be set or expanded at a preselected position within the pipeline, rotation of the take-up nut 41 will cause plate 62 to be drawn up tight against plate 33 so as to compress the O-ring seal 63 against plate 33 and close the discharge ports 64 of the bore 61. Further rotation of the take-up nut 41 compresses the rubber against the walls of a pipe. Provision of a fluid flow passage such as bore 61 through the pipeline plug of FIGURE 3, provides means for bypassing fluid past the pipeline plug.

Alternatively, fluid may be bypassed around plug 23 (FIGURE 1) by tapping into the pipeline 11 under pressure in a manner well known to the art and installing, say, a 2-inch bypass line 65 around the upstream plug 23 and a similar bypass line 66 around the downstream plug 24. The bypasses 65 and 66 are provided with suitable valves 67 and 68 for closing the bypass lines when not in use.

The pipeline plugs 23 and 24 (FIGURE 1) of the present invention are positioned at preselected spaced points within a pipeline 11 by means of inserting rods 70 and 71 through fluidtight closures 72 and 73 with the upper ends of the rods 70 and 71 extending from the upper end of the closures 72 and 73. The rods 70 and 71 are provided with suitable means for rotating them such as handles 74 and 75 or small motors (not shown).

A rod-like stop element 80 is shown in greater detail in FIGURE 2 in its installed position. Prior to installing the rod or stop element 80 in the pipeline, a cup 81 is welded to the bottom of the pipeline and a suitable packing head or closure element, diagrammatically represented by element 82, is welded to the top of the pipeline diametrically opposite the cup 81 on the bottom thereof. On some types of pipeline it may be necessary to previously weld a full band of metal 83 around the entire pipe to reinforce it. The cup 81 and closure member 82 are then welded to the reinforcing band 83. Closure element 82 represents any suitable device employed to surround a shaft in a fluidtight manner while a pipeline under pressure has a pair of holes drilled therethrough. Since closure means of this type are well known to the art and do not form a novel part of the present invention they will not be further described here.

After the holes have been drilled through the pipeline, the rod or stop element is inserted therein. Alternatively, the lower end of the rod may be provided with a drill bit 84 adapted to bore holes through the pipeline and remain in the lower hole, as illustrated, when the rod 80 is in its operative position. The rod 80 is provided with suitable gears adapted to engage the beveled drive gear 45 of the plug when brought in contact therewith. In the arrangement shown the upper end of the rod is provided with a beveled drive gear 85 while the lower end of the rod is provided with a beveled idler gear 86 to take thrust only. Upon rotation of a handle 87 of the rod 80, the beveled drive gear 85 will be rotated and in turn cause rotation of the ring gear 45 and the nut 41 connected to shaft 32, thus causing the rubber sphere 30 to be compressed between the end plates 33 and 34 and expanded against the inner walls of the pipe line 11.

In the event that it is desired to carry out some operation on the section of the pipe line under pressure a pair of holes are drilled in a fluidtight manner through the pipeline at preselected upstream and downstream points. Stop member 71 is then inserted through the drilled downstream hole and positioned transversely in the pipeline.

A pipeline plug 24 is then inserted through the scraper entrance chamber 12 upstream of the stop member 71 with valves 15 and 17 closed and valve 16 open. After cover 14 of the scraper barrel 12 has been closed, valves 15 and 17 are opened and valve 16 is closed to allow the fluid stream to propel the pipeline plug 24 through the pipe 11 until it is positioned against the downstream stop member 71. At this time valve 68 in bypass line 66 is preferably open to faciliate pumping of fluid past the pipeline plug 24. These operations are repeated with the second pipeline plug 23 which is positioned at the upstream stop member 70 with valve 67 in bypass pipeline 65 being open to reduce the initial impact of the pipeline plug against the stop member.

In the event that a static head exists in the pipeline, sufficient pressure will be exerted against the pipeline plugs 23 and 24 to keep their ring gears 45 (FIGURE 2) in engagement with the drive gear 85 on the stop member. If no static head exists it may be found desirable to continue pumping of the fluid very slowly after the pipeline plugs 23 and 24 have arrived at their destinations. However, in many installations, it will be possible to shut off the pipeline pumps when the plugs 23 and 24 have arrived at their destination. If desired, the pipeline plugs 23 and 24 may be pumped simultaneously in spaced relationship within the pipeline, it being understood that pipeline plug 24 must pass the upstream position of rod or stop element 70 before rod 70 has been inserted into the pipeline.

With the ring gears of the two plugs mechanically engaging the drive gears on the rod elements, the rod elements 70 and 71 are rotated by hand or by any mechanical means so that the rubber spheres are compressed to form fluidtight barriers within the pipeline. Valves 67 and 68 in the bypass lines 65 and 66 are closed prior to tapping in the section of pipeline 90 between the two plugs. By tapping the section of pipeline 90 the fluid therein may be drawn off and stored in a tank or otherwise drained away so as to empty the section of line that it is desired to work on. After operations have been completed on the section of line 90 the tapped drain holes therein and/or any other openings are closed in a fluidtight manner prior to disengaging the expanded plugs 23 and 24 therein. The plugs 23 and 24 are disengaged by rotation of rods 70 and 71 in the opposite direction to that which was used to set them originally. After disengaging the plugs 23 and 24 from the walls of the pipeline, the stop members 70 and 71 are withdrawn from the pipeline 11 in a fluidtight manner and pumping of the fluid within the pipeline is resumed. With valves 21 and 19 being opened at the downstream scraper trap 13, both plugs 23 and 24 will be caught in the scraper trap 13 and can be removed from the pipeline through removable cover 18 after opening valve 20 and closing valves 21 and 19.

In order to keep the ring gear 45 in engagement with the drive gear 85, it may be found desirable to provide means for locking the plug in place within the pipeline. For example, threaded collar elements 91 and 92 may be fixedly attached to the pipeline or to the reinforcing band 83 over holes drilled therein. Locking pins 93 and 94 are threadedly positioned in the collar elements and are extendible therefrom into a portion of the plug, for example, into plate 34, as illustrated. The top of the collar elements may be normally closed in a fluidtight manner by a valve, or the locking pin may form the closure member of a needle valve whose body would form the collar element 91 or 92. The spacing between the holes for the shaft 80 and the pins 93 and 94 would be determined by the spacing between plate 34 and ring gear 45. A groove 95 is provided in the edge of plate 34 to receive the ends of pins 93 and 94.

I claim as my invention:

1. Apparatus for closing and isolating a section of a pipeline under pressure, said apparatus comprising a pair of pipe plugs adapted to be propelled by fluid flow through a pipeline to predetermined spaced positions within said pipeline, stop means positioned in said pipeline and extending through the wall thereof at said predetermined positions for stopping said plugs, means enclosing in a fluidtight manner a portion of said stop means extending outside said pipeline, first gear means positioned on said stop means within said pipeline, each of said pipe plugs comprising a resilient packer element of a size to pass through said pipeline, clamping plates on the upstream and downstream sides of said packer element, a shaft extending through said packer element and operatively connected to said clamping plates, means connected to at least one end of said shaft for adjusting the length of the shaft between the clamping plates to compress the packer element, second gear means carried by said means for adjusting the length of the shaft, said second gear means being adapted to engage and be operated by the first gear means of a stop means.

2. Apparatus for closing and isolating a section of a pipeline under pressure, said apparatus comprising a pair of pipe plugs adapted to be propelled by fluid flow through a pipeline to predetermined spaced positions within said pipeline, stop means positioned in said pipeline and extending through the wall thereof at said predetermined positions for stopping said plugs, means enclosing in a fluidtight manner portions of said stop means extending outside said pipeline, first gear means positioned on said stop means within said pipeline, each of said pipe plugs comprising a rubber packer element of a normal diameter to pass through said pipeline, clamping discs on the upstream and downstream sides of said packer element, a shaft at least partially threaded and rotatably extending through said packer element and operatively connected to said clamping discs, nut means connected to one end of said shaft for adjusting the length of the shaft between the clamping discs to compress the packer element, second gear means carried by said nut means, said second gear means being adapted to engage and be operated by the first gear means of a stop means.

3. Apparatus for closing and isolating a section of a pipeline under pressure, said apparatus comprising a pair of pipe plugs adapted to be propelled by fluid flow through a a pipeline to predetermined spaced positons within said pipeline, rotatable rod element stop means positioned transversely in said pipeline and extending through the wall thereof at said predetermined positions for stopping said plugs, means enclosing in a fluidtight manner portions of said stop means extending outside said pipeline, rotatable drive gear means positioned on said rod element stop means within said pipeline, each of said pipe plugs comprising a spherical resilient rubber packer element of a normal diameter less than that of the internal diameter of said pipeline, clamping discs on the upstream and downstream sides of said packer element, a shaft rotatably extending through said packer element and said downstream clamping disc and secured to said upstream clamping discs against axial displacement, the downstream end of said shaft being threaded, nut means connected to the downstream end of said shaft for adjusting the length of the shaft between the clamping discs to compress the packer element, ring gear means of a diameter slightly less than the bore of the pipeline, said gear means being carried by said nut means and extending forward thereof, said ring gear means being adapted to engage and be rotated by the drive gear means of a rod element stop means.

4. Apparatus for closing and isolating a section of a pipeline under pressure, said apparatus comprising a pair of pipe plugs adapted to be propelled by fluid flow through a pipeline to predetermined spaced positions within said pipeline, rotatable rod element stop means positioned transversely in said pipeline and extending through the wall thereof at said predetermined positions for stopping said plugs, means enclosing in a fluidtight manner portions of said stop means extending outside said pipeline, rotatable drive gear means and idler gear means positioned on said rod element stop means within said pipeline, a drill bit carried on the leading end of said rod element stop means for drilling through the walls of said pipeline during positioning of the rod element, one of said stop means adapted to be positioned in said pipeline before the arrival of its contacting pipe plug, the upstream stop means being positioned after the passage of one of said pipe plugs, each of said pipe plugs comprising a spherical resilient rubber packer element of a normal diameter less than that of the internal diameter of said pipeline, clamping discs on the upstream and downstream sides of said packer element, a shaft rotatably extending through said packer element and said downstream clamping disc and secured to said upstream clamping disc against axial displacement, the downstream end of said shaft being threaded, nut means connected to the downstream end of said shaft for adjusting the length of the shaft between the clamping discs to compress the packer element, ring gear means of a diameter slightly less than the bore of the pipeline said gear means being carried by said nut means and extending forward thereof, said ring gear means being adapted to engage and be rotated by the drive gear means of a rod element stop means.

References Cited in the file of this patent

UNITED STATES PATENTS

| | | |
|---|---|---|
| 834,393 | Meister | Oct. 30, 1906 |
| 2,786,489 | Morrill | Mar. 26, 1957 |
| 2,929,410 | Morrison | Mar. 20, 1960 |